US009134537B2

(12) United States Patent
Kajiyama et al.

(10) Patent No.: US 9,134,537 B2
(45) Date of Patent: Sep. 15, 2015

(54) LASER LIGHTING DEVICE

(75) Inventors: Koichi Kajiyama, Yokohama (JP);
Michinobu Mizumura, Yokohama (JP);
Makoto Hatanaka, Yokohama (JP);
Yoshikatsu Yanagawa, Yokohama (JP)

(73) Assignee: V TECHNOLOGY CO., LTD., Yokohama-Shi, Kanagawa (JP)

( * ) Notice: Subject to any disclaimer, the term of this patent is extended or adjusted under 35 U.S.C. 154(b) by 54 days.

(21) Appl. No.: 14/009,807

(22) PCT Filed: Apr. 3, 2012

(86) PCT No.: PCT/JP2012/059100
§ 371 (c)(1),
(2), (4) Date: Nov. 7, 2013

(87) PCT Pub. No.: WO2012/137784
PCT Pub. Date: Oct. 11, 2012

(65) Prior Publication Data
US 2014/0063808 A1 Mar. 6, 2014

(30) Foreign Application Priority Data

Apr. 5, 2011 (JP) .................................. 2011-084019
Jan. 31, 2012 (JP) .................................. 2012-018729

(51) Int. Cl.
*G02F 1/03* (2006.01)
*G02F 1/07* (2006.01)
*G02B 27/10* (2006.01)
*G02B 27/09* (2006.01)
*G02B 27/48* (2006.01)
*G02F 1/19* (2006.01)

(52) U.S. Cl.
CPC ............ *G02B 27/0955* (2013.01); *G02B 27/48* (2013.01); *G02F 1/0311* (2013.01); *G02F 1/0322* (2013.01); *G02F 1/19* (2013.01); *G02F 2202/20* (2013.01)

(58) Field of Classification Search
CPC ............ B23K 26/063; B23K 26/0639; B23K 26/0648; B23K 26/032; B23K 26/0853; H01L 21/02686; G02B 27/0955; G02B 27/48; G02F 1/0311; G02F 1/0322; G02F 1/19
USPC ................. 359/245–279, 315–320, 322, 323, 359/484.01–484.1
See application file for complete search history.

(56) References Cited

FOREIGN PATENT DOCUMENTS

| JP | 62-280818 A | 12/1987 |
|---|---|---|
| JP | 2004-012757 A | 1/2004 |
| JP | 2009-042373 A | 2/2009 |
| JP | 2010-182731 A | 8/2010 |
| WO | WO 2010/090190 A1 | 8/2010 |

OTHER PUBLICATIONS

International Search Report (ISR) (PCT Form PCT/ISA/210) dated May 1, 2012, in, PCT/JP2012/059100.

*Primary Examiner* — Mahidere Sahle
(74) *Attorney, Agent, or Firm* — McGinn IP Law Group, PLLC

(57) ABSTRACT

In a laser lighting device, a fly's eye lens and a condenser lens are disposed in an optical path of pulsed laser light emitted from a light source, and an electro-optical crystal element for continuously changing the deflection direction of the pulsed laser light with respect to the incident light and allowing the deflected light to pass therethrough is disposed in a position between the light source and the fly's eye lens or between the fly's eye lens and the condenser lens. The electro-optical crystal element is formed, for example, of a pair of electrodes and an optical crystal material disposed between the electrodes, and a voltage is applied between the electrodes to produce an electric field that changes the refractive index of the electro-optical crystal element. As a result, non-uniform illumination due to interference fringes produced by light having passed through the fly's eye lens can be reduced.

10 Claims, 18 Drawing Sheets

FIG. 2
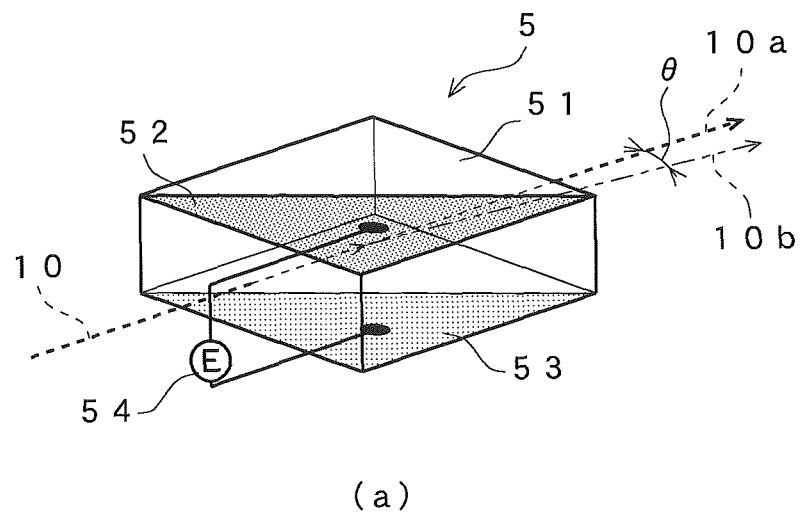
(a)
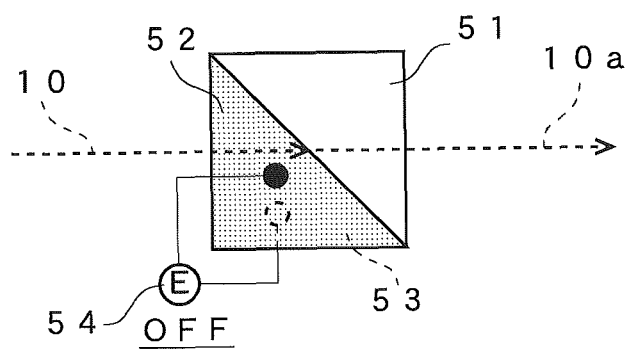
(b)
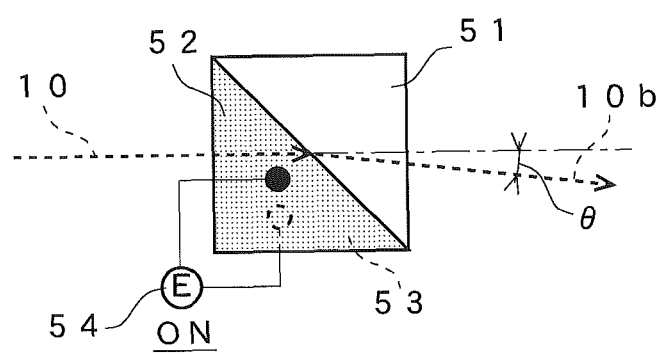
(c)

FIG. 4
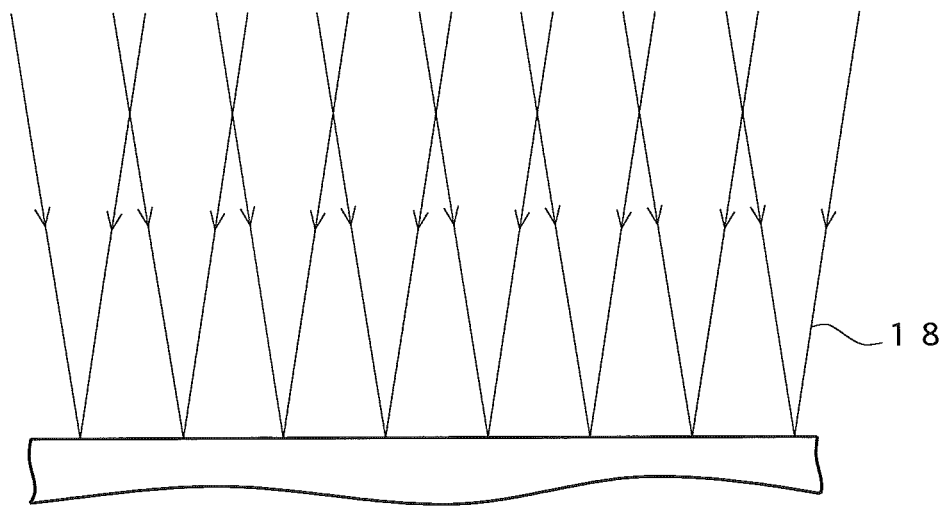
(a)
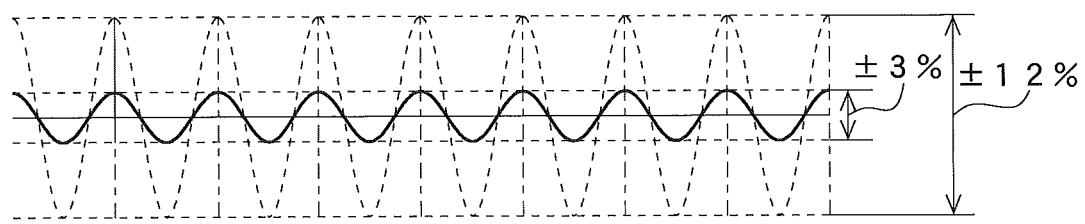
(b)

FIG. 19

| OUTPUT (×1) | OUTPUT (×4) |
|---|---|
| | |
| | |

CONDITION 1
NO PULSE VOLTAGE IS
APPLIED TO LN CRYSTAL
NUMBER OF SHOTS:1
NO DIFFUSER PLATE
WEDGE PRISM:NO ROTATION

CONDITION 2 AFTER IMPROVEMENT
PULSE IS APPLIED TO LN CRYSTAL
NUMBER OF SHOTS:4
DIFFUSER PLATE PRESENT
WEDGE PRISM:ROTATED BY
ONE-HALF TURN

FIG. 20
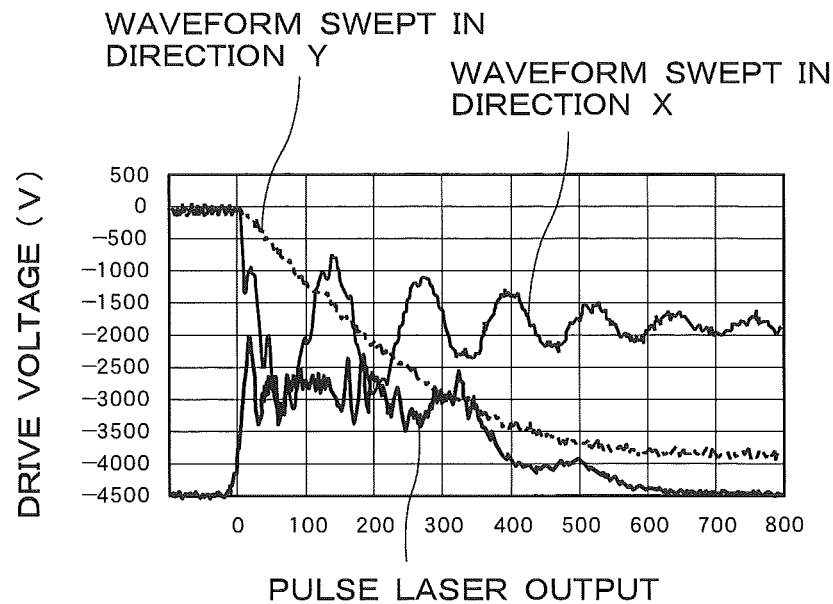
(a)
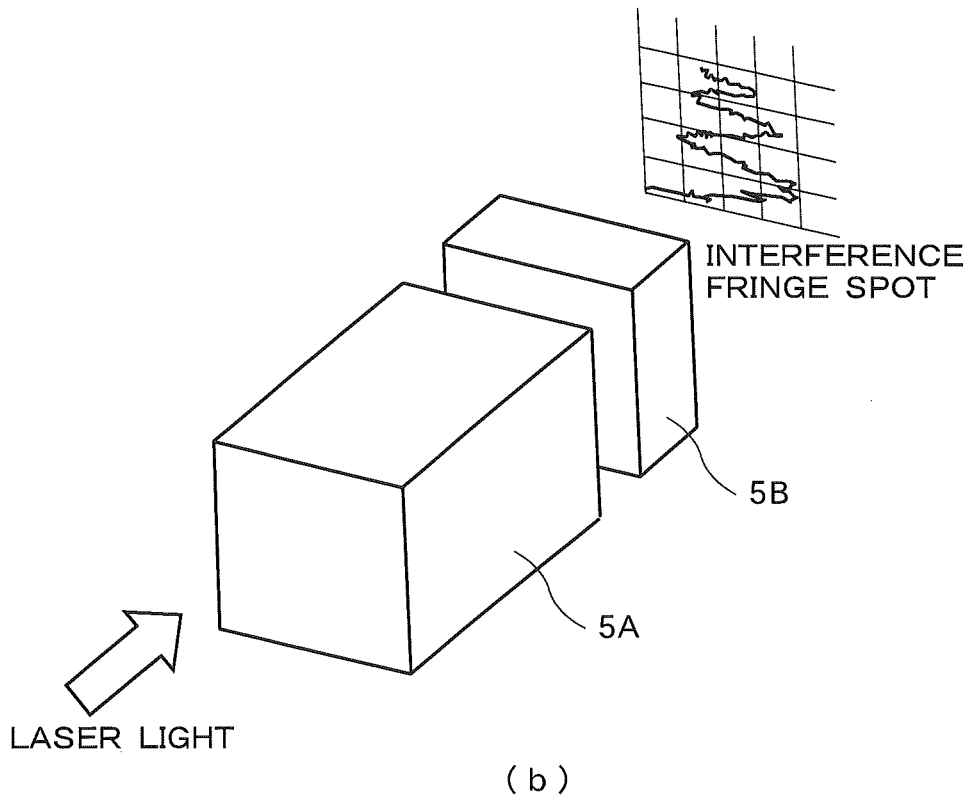
(b)

FIG. 21
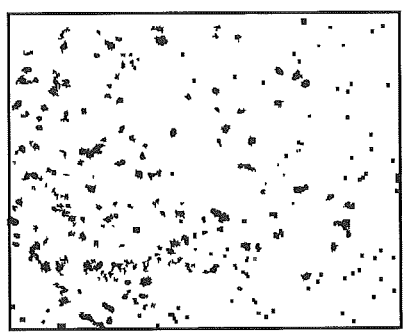  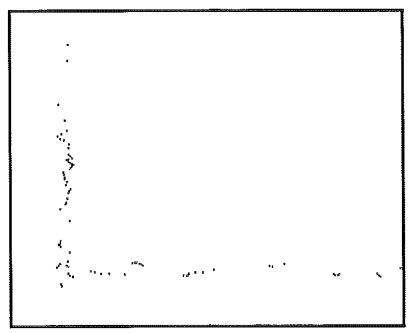
SWEEP OFF　　　　　　　　　　SWEEP ON

LASER LIGHTING DEVICE

TECHNICAL FIELD

The present invention relates to a laser lighting device used for laser annealing and other purposes, and particularly to a laser lighting device capable of reducing non-uniform illumination due to interference fringes generated by pulsed laser light having passed through a fly's eye lens that homogenizes the intensity of the pulsed laser light.

BACKGROUND ART

A laser lighting device of related art used for laser annealing and other purposes uses a fly's eye lens that homogenizes the intensity of laser light in a plane perpendicular to the optical axis thereof. That is, a fly's eye lens is so formed as to have a substantially flat plate shape as a whole in which a plurality of convex lenses is arranged in a grid pattern. When laser light passes through a fly's eye lens, the light having passed through each of the convex lenses is focused at the focal point of the lens and then diverges. The plurality of divided laser light beams is superimposed on each other and incident on the following optical member. Therefore, even when light incident on the fly's eye lens, for example, has a non-uniform intensity distribution in a plane perpendicular to the optical axis of the incident light, the fly's eye lens can homogenize the non-uniform intensity distribution. For example, laser light emitted from a light source may have a Gaussian intensity distribution in a plane perpendicular to the optical axis of the laser light, or non-uniform illumination may occur when the laser light is reflected off a total reflection mirror or any other optical member in some cases. Providing a fly's eye lens can solve the undesirable situations described above.

When a fly's eye lens is used in a laser lighting device, however, the coherency of laser light undesirably produces interference fringes in an area irradiated with the laser light, resulting in non-uniform illumination.

A variety of technologies for reducing the degree of interference fringes produced by laser light having passed through a fly's eye lens have therefore been proposed. For example, patent document 1 describes that an optical path difference adjustment member for reducing the degree of laser light interference is provided between a beam expander that increases the width of laser light and a fly's eye lens.

Further, the inventors of the present application have proposed in patent document 2 a technology for reducing the degree of interference fringes by providing a first optical path difference adjustment member formed of a plurality of light transmissive members in the optical path of laser light emitted from a light source, causing light having passed through the first optical path difference adjustment member to pass through a fly's eye lens where the intensity of the laser light is homogenized, causing the homogenized laser light to pass through a condenser lens where the laser light is collimated, causing the collimated laser light to pass through a second optical path difference adjustment member formed of a plurality of plate-shaped light transmissive members, and causing the light having passed through the second optical path difference adjustment member to pass through another fly's eye lens.

Patent document 1: Japanese Patent Application Kokai Publication [No. 2004-12757]

Patent document 2: Japanese Patent Application Kokai Publication [No. 2010-182731]

DISCLOSURE OF THE INVENTION

Problems the Invention Is Intended to Solve

The laser lighting devices described in patent documents 1 and 2 described above, however, cannot sufficiently eliminate interference fringes in some cases. For example, each of the optical path difference adjustment members, each of which has a fixed optical path length, needs to be replaced with another when the wavelength of laser light is different. If it is only the wavelength of laser light that is changed, interference fringes are produced, undesirably resulting in non-uniform illumination in an area irradiated with the laser light.

The invention has been contrived in view of the problem described above. An object of the invention is to provide a laser lighting device capable of reducing non-uniform illumination due to interference fringes produced by light having passed through a fly's eye lens.

Means for Solving the Problems

A laser lighting device according to the invention includes a light source for emitting pulsed laser light, a homogenizing member disposed in an optical path of the pulsed laser light from the light source, the homogenizing member adapted for homogenizing the intensity of the pulsed laser light in a plane perpendicular to an optical axis of the pulsed laser light, and a condenser lens disposed in the optical path of the pulsed laser light having passed through the homogenizing member, the condenser lens adapted for collimating incident light, and allowing the collimated light to pass therethrough; wherein the laser lighting device has: an electro-optical crystal element disposed in the optical path of the pulsed laser light in a position between the light source and the homogenizing member or between the homogenizing member and the condenser lens, the electro-optical crystal element adapted for continuously changing a deflection direction of incident light, and allowing the deflected light to pass therethrough.

In the laser lighting device according to the present invention, the homogenizing member may be a fly's eye lens or a rod lens. Further, the electro-optical crystal element may have a pair of electrodes disposed in parallel to the optical axis of the pulsed laser light and an optical crystal material disposed between the electrodes, and a voltage may be applied between the electrodes to produce an electric field that changes a refractive index of the electro-optical crystal element and hence changes the direction in which the incident light is deflected. In this case, a cycle of the voltage applied between the electrodes is preferably synchronized with a cycle of the pulsed laser light.

The laser lighting device according to the invention, for example, further includes a light diffuser disposed in the optical path of the pulsed laser light in a position between the electro-optical crystal element and the condenser lens, the light diffuser adapted for diffusing incident light in such a way that the diffused light spreads away from an optical axis of the incident light, and allowing the diffused light to pass therethrough, or a deflector disposed in the optical path of the pulsed laser light in a position between the electro-optical crystal element and the condenser lens, the deflector adapted for deflecting incident light with respect to an optical axis thereof, and allowing the deflected light to pass therethrough. The laser lighting device may alternatively further include a deflector disposed in the optical path of the pulsed laser light having passed through the electro-optical crystal element, the deflector adapted for deflecting incident light with respect to an optical axis thereof, and allowing the deflected light to pass therethrough; and a light diffuser for diffusing the light having passed through the deflector so that the diffused light spreads away from an optical axis of the light having passed through the deflector and allowing the diffused light to pass therethrough, and the light having passed through the light diffuser may be incident on the condenser lens.

A laser lighting device according to the invention includes a light source for emitting pulsed laser light, one or more fly's eye lenses disposed in an optical path of the pulsed laser light from the light source, the fly's eye lenses adapted for homogenizing the intensity of the pulsed laser light in a plane perpendicular to an optical axis of the pulsed laser light; a plurality of condenser lenses disposed in the optical path of the pulsed laser light having passed through the fly's eye lenses, the condenser lenses adapted for collimating incident light, and allowing the collimated light to pass therethrough; a first electro-optical crystal element disposed in the optical path of the pulsed laser light in a position between the light source and a condenser lens disposed in a last stage, the first electro-optical crystal element adapted for continuously changing a deflection direction of incident light in a direction X in a plane perpendicular to an optical axis of the laser light, and allowing the deflected light to pass therethrough; a second electro-optical crystal element disposed in the optical path of the pulsed laser light in a position between the light source and the condenser lens disposed in the last stage, the second electro-optical crystal element adapted for continuously changing a deflection direction of incident light in a direction Y perpendicular to the direction X in the plane perpendicular to the optical axis of the laser light, and allowing the deflected light to pass therethrough; and a controller for controlling voltages applied to the electro-optical crystal elements in association with each other to continuously move interference fringes two-dimensionally in a plane irradiated with light having passed through the fly's eye lenses.

In the laser lighting device according to the invention, for example, each of the electro-optical crystal elements has a pair of electrodes disposed in parallel to the optical axis of the pulsed laser light and an optical crystal material disposed between the electrodes, and a voltage is applied between the electrodes to produce an electric field that changes a refractive index of the electro-optical crystal element and hence changes the direction in which the incident light is deflected. In this case, a cycle of the voltage applied between the electrodes is preferably synchronized with a cycle of the pulsed laser light.

Further, the controller preferably controls the applied voltages in such a way that the deflection direction of the laser light is changed by the first electro-optical crystal element at a higher speed than the deflection direction of the laser light is changed by the second electro-optical crystal element.

The laser lighting device according to the invention may further include a light diffuser disposed in the optical path of the pulsed laser light in a position between the electro-optical crystal elements and the condenser lens, the light diffuser adapted for diffusing incident light in such a way that the diffused light spreads away from an optical axis of the incident light, and allowing the diffused light to pass therethrough, or a deflector disposed in the optical path of the pulsed laser light in a position between the electro-optical crystal elements and the condenser lens, the deflector adapted for deflecting incident light with respect to an optical axis thereof, and allowing the deflected light to pass therethrough.

Effects of the Invention

Since the laser lighting device according to the invention includes an electro-optical crystal element disposed in the optical path of the pulsed laser light in a position between the light source and the homogenizing member or between the homogenizing member and the condenser lens, the electro-optical crystal element continuously changing the deflection direction of incident light, and allowing the deflected light to pass therethrough, the deflection direction of the pulsed laser light having passed through the homogenizing member that homogenizes the intensity of the pulsed laser light is continuously changed when the pulsed laser light passes through the electro-optical crystal element, or the intensity of the pulsed laser light having passed through the electro-optical crystal element, which continuously changes the deflection direction of the pulsed laser light is homogenized when the pulsed laser light passes through the homogenizing member. As a result, the positions where interference fringes are produced by light having passed through the homogenizing member continuously change, whereby the luminance of the pulsed laser light emitted from the laser lighting device can be homogenized over an entire area irradiated with the laser light and hence non-uniform illumination can be reduced.

In some of the laser lighting devices according to the invention, the pulsed laser light passes through the fly's eye lens, which homogenizes the optical intensity of the pulsed laser light two-dimensionally, and the first and second electro-optical crystal elements move interference fringes produced by the pulsed laser light having passed through the fly's eye lens two-dimensionally to eliminate non-uniform illumination. That is, when the pulsed laser light passes through the first electro-optical crystal element, the deflection direction of the pulsed laser light is continuously changed in the direction X in a plane perpendicular to the optical axis, and when the pulsed laser light passes through the second electro-optical crystal element, the deflection direction of the pulsed laser light is continuously changed in the direction Y in the plane perpendicular to the optical axis. In the configuration described above, the controller controls the drive voltages applied to the first and second electro-optical crystal elements in association with each other to change the deflection direction of the pulsed laser light in the directions X and Y. As a result, interference fringes generated by light having passed through the fly's eye lens move in the directions X and Y two-dimensionally in the plane perpendicular to the optical axis of the laser light. That is, the interference fringes move, for example, in a serpentine manner in an X-Y plane including the directions X and Y. As a result, the pulsed laser light emitted from the laser lighting device has a reduced amount of non-uniform illumination due to the interference fringes, and the luminance of the pulsed laser light is homogenized over an entire area irradiated with the laser light, whereby non-uniform illumination can be reduced.

BRIEF DESCRIPTION OF THE DRAWINGS

FIGS. 2(a) to 2(c) show the configuration of an electro-optical crystal element according to the embodiment of the invention;

FIG. 4(a) is a schematic view showing light emitted from the laser lighting device according to the embodiment of the invention, and FIG. 4(b) shows an example of the waveform of interference fringes produced by the light emitted from the laser lighting device;

FIG. 19 shows a decrease in interference fringes (represented by dots) in the case in which the deflection direction of laser light is changed in a single direction;

FIG. 20(a) shows the waveforms of the drive voltages in a case in which the deflection direction of laser light is changed in two directions, directions X and Y, and FIG. 20(b) shows an interference fringe spot moved in accordance with the change; and FIG. 21 shows a decrease in interference fringes (represented by dots) in the case in which the deflection direction of laser light is changed in the two directions, the directions X and Y.

BEST MODE FOR CARRYING OUT THE INVENTION

Figure 1:
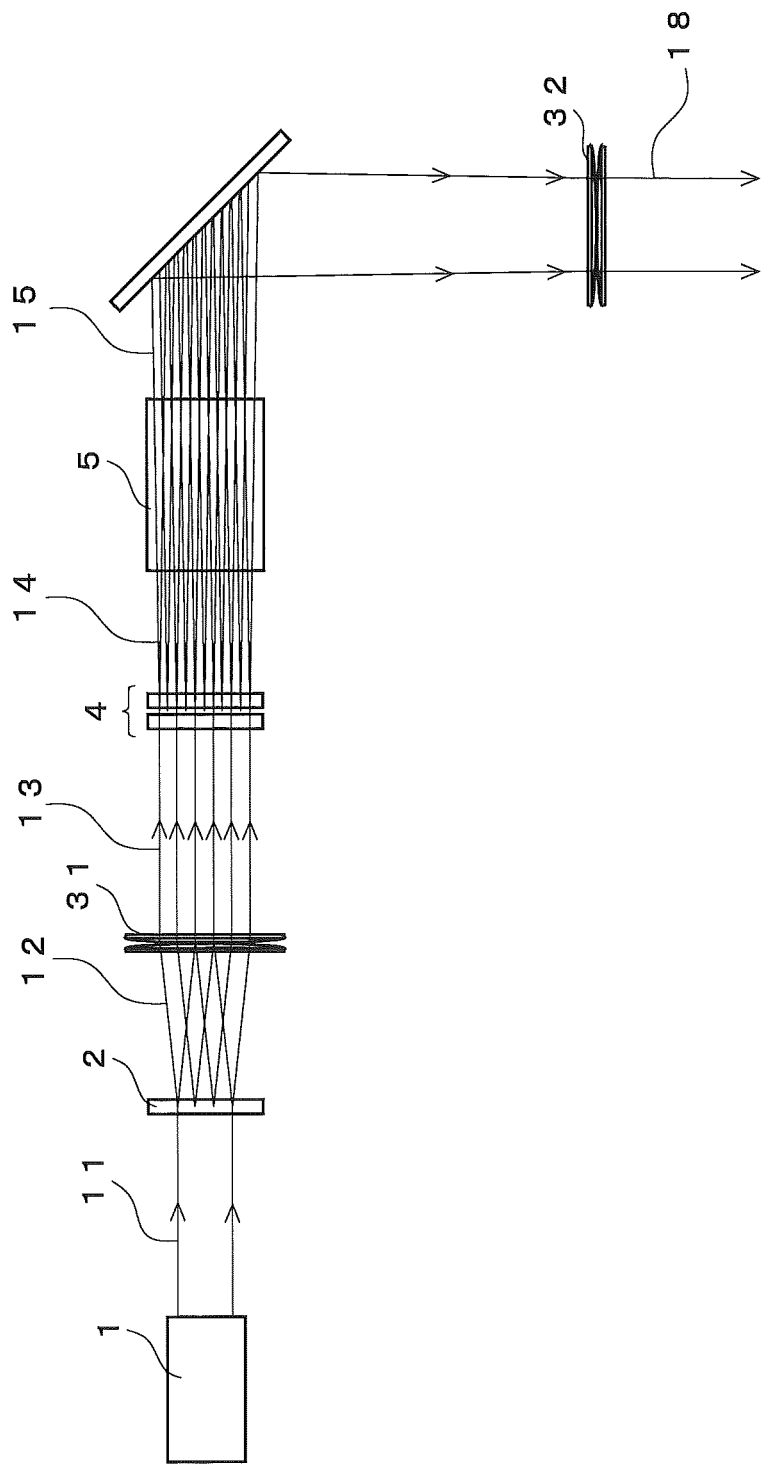
FIG. 1 is a schematic view showing the configuration of a laser lighting device according to a first embodiment of the invention.

A laser lighting device according to embodiments of the invention will be described below. FIG. 1 is a schematic view showing the configuration of a laser lighting device according to a first embodiment of the invention. FIGS. 2(a) to (c) show the configuration of an electro-optical crystal element used in the embodiments of the invention. This laser lighting device includes a light source 1, which emits pulsed laser light 11, a (first) fly's eye lens 2 as a homogenizing member that homogenizes the intensity of the pulsed laser light in a plane perpendicular to the optical axis thereof, and a (second) condenser lens 32, which is disposed in the most downstream position on the optical path of the laser light, collimates incident light, and allows the collimated light to pass therethrough, as in a laser lighting device of related art. In the present embodiment, the laser lighting device further includes a first condenser lens 31 provided in the optical path of pulsed laser light 12 having passed through the fly's eye lens 2, as shown in FIG. 1. The light 12 having passed through the fly's eye lens 2 becomes collimated light 13 after passing through the first condenser lens 31. Further, a second fly's eye lens 4 is provided in the optical path of the light 13 having passed through the first condenser lens 31, and the second fly's eye lens 4 further homogenizes the intensity of the pulsed laser light in a plane perpendicular to the optical axis thereof.

In the present embodiment, an electro-optical crystal element 5 is provided in the optical path of the pulsed laser light having passed through the second fly's eye lens 4 as shown in FIG. 1, and light incident on the electro-optical crystal element 5 passes therethrough upon the deflection direction of the light being continuously changed. The light having passed through the electro-optical crystal element 5 passes through the second condenser lens 32 and is emitted in the form of collimated pulsed laser light. In the invention, a total reflection mirror and other optical members may be provided in positions between the optical elements described above, for example, as shown in FIG. 1.

The light source 1 is a laser light source for emitting pulsed laser light and emits laser light in the form of pulses in a predetermined cycle based, for example, on Q-switch laser oscillation. For example, the pulsed laser light has a frequency of 50 Hz (a cycle of 20 milliseconds) and a pulse width of 220 nanoseconds.

Each of the first and second fly's eye lenses 2, 4 as the homogenizing member that homogenizes the laser intensity is so formed that it has a substantially flat plate shape as a whole in which a plurality of convex lenses is arranged in a grid pattern, as in related art. When laser light passes through each of the fly's eye lenses, the light having passed through each of the convex lenses is focused at the focal point of the lens and then diverges. The plurality of divided laser light beams is then superimposed on each other and impinges on the following optical member. Therefore, even when light incident on each of the fly's eye lenses 2 and 4, for example, has a non-uniform intensity distribution in a plane perpendicular to the optical axis of the incident light, the fly's eye lens can homogenize the non-uniform intensity distribution. The present embodiment will be described with reference to a case in which a fly's eye lens is provided as the homogenizing member, but the homogenizing member can, for example, be a rod lens. That is, a rod lens is made of a rectangular-column-shaped light transmissive material and has both end surfaces polished. Divergent light incident on one of the end surfaces of the rod lens is reflected multiple times in a light transmissive portion of the rod lens before the light is emitted from the other end surface. The intensity of the laser light can thus be homogenized. Alternatively, a rod lens is made of a circular-column-shaped light transmissive material. When collimated light is incident on a side surface of the rod lens, the light passes through a light transmissive portion thereof, is focused into a point in a plane perpendicular to the optical axis, diffused, and emitted from the lens. The intensity of the laser light can thus be homogenized.

Each of the first and second condenser lenses 31, 32 is known as a focusing lens, and exposure light incident on the condenser lens passes therethrough in the form of collimated pulsed laser light 13 and 18.

The electro-optical crystal element 5 is formed of a pair of electrodes 52 and 53, which are disposed in parallel to the optical axis of pulsed laser light 10, and an optical crystal material 51 disposed between the electrodes 52 and 53, and a voltage is applicable between the electrodes 52 and 53 by a power source 54 as shown, for example, in FIG. 2(*a*). The optical crystal material 51 is a light transmissive crystal material made, for example, of Li and Nb (LN crystal material). The refractive index of the optical crystal material 51 changes when a voltage is applied between the electrodes 52 and 53 to produce an electric field E. That is, when a voltage of zero is applied between the electrodes 52 and 53, no electric field E is produced (E=0) and the pulsed laser light 10 incident on the optical crystal material 51 is not deflected but directly passes therethrough as shown in FIG. 2(*b*) (passed light 10*a* in FIG. 2(*b*)), whereas when a nonzero voltage is applied between the electrodes 52 and 53, an electric field E is produced and the pulsed laser light 10 incident on the optical crystal material 51 is deflected by angle θ with respect to the direction in which the pulsed laser light 10 is incident and allowed to pass through, as shown in FIG. 2(*c*) (passed light 10*b* in FIG. 2(*c*)). For example, when the optical crystal material 51 is made of an LN crystal material, the wavelength of light that can pass through the optical crystal material 51 ranges from 370 to 5000 nm, within which the wavelength of the pulsed laser light to be used in the invention falls. The refractive index n of an LN crystal material is given by the following Expressions 1 and 2 and is a function of the electric field E [V/m] produced by the voltage application or proportional to the strength of the electric field E. In the following Expressions 1 and 2, $n_e$ and $r_{33}$ are coefficients. For example, $n_e$=2.156 and $r_{33}$=3.2× $10^{-11}$ [m/V] when the wavelength of the pulsed laser light is 1064 nm.

$$n=n_e+\Delta n \quad \text{[Expression 1]}$$

$$\Delta n=0.5\times n_e^3\times r_{33}\times E \quad \text{[Expression 2]}$$

Figure 3:
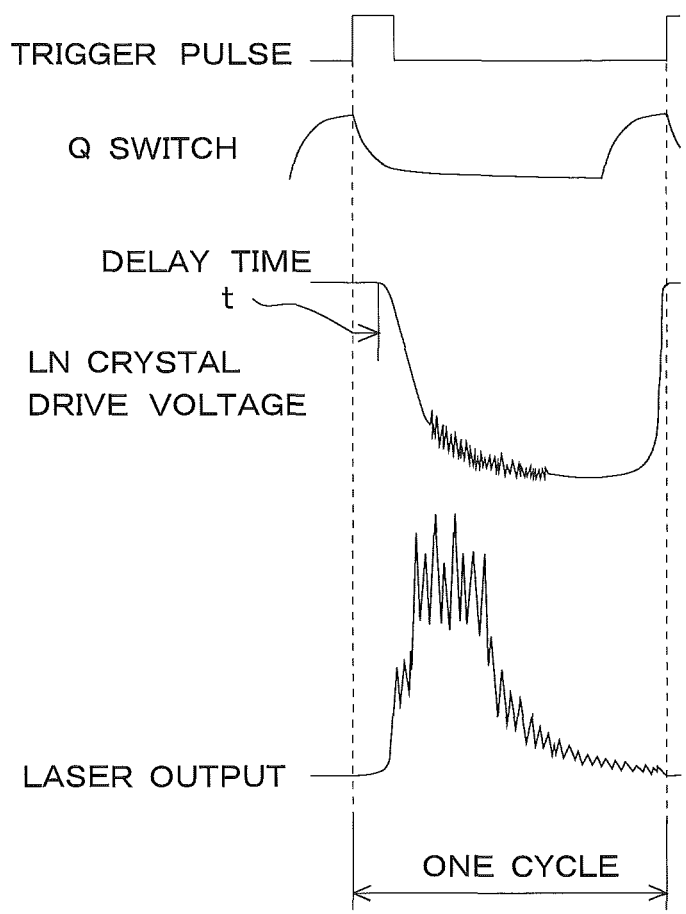
FIG. 3 shows the relationship between the waveform of a voltage applied to the electro-optical crystal element and the laser power waveform of pulsed laser light according to the embodiment of the invention.

The voltage applied between the electrodes 52 and 53 of the electro-optical crystal element 5 is continuously changed as shown, for example, in FIG. 3. The deflection direction of the light that passes through the electro-optical crystal element 5 therefore also continuously changes. FIG. 3 shows the laser power waveform of the pulsed laser light in correspondence with the waveform of the voltage applied to the electro-optical crystal element.

The cycle of the voltage applied between the electrodes 52 and 53 of the electro-optical crystal element 5 is preferably synchronized with the cycle of the pulsed laser light, as shown in FIG. 3. That is, after the pulsed laser light is emitted from the light source 1 based on Q-switch laser oscillation, the power of the pulsed laser light gradually increases, repeatedly increases and decreases in the vicinity of a maximum of the power, then decreases, and eventually becomes zero. In this process, a trigger pulse is outputted at the timing when the pulsed laser light is emitted, and voltage application between the electrodes 52 and 53 is initiated in response to the trigger pulse with a predetermined delay t to produce the electric field E. A voltage having, for example, a ramp shape waveform is applied between the electrodes 52 and 53, and the voltage between the electrodes is gradually increased with elapsed time and lowered back to zero after a predetermined period, as shown in FIG. 3. When the cycle of the applied voltage is synchronized with the cycle of the pulsed laser light as described above, the voltage applied between the electrodes 52 and 53 is readily controlled.

In the present embodiment, in which the electro-optical crystal element 5 is provided to continuously change the deflection direction of the light incident thereon, light having passed through the fly's eye lenses 2 and 4 produces interference fringes in continuously changing positions. The pulsed laser light emitted from the laser lighting device therefore has homogenized luminance over an entire area irradiated with the laser light. FIG. 4(*a*) is a schematic view showing light emitted from the laser lighting device according to the embodiment of the invention, and FIG. 4(*b*) shows an example of the waveform of interference fringes produced by the light emitted from the laser lighting device. When no electro-optical crystal element 5 is provided, interference fringes are produced, for example, at intervals of 150 μm, as shown in FIG. 4(*a*). The luminance of the interference fringes varies, for example, by ±12% with respect to a predetermined luminance value as indicated by the broken line in FIG. 4(*b*), which increases non-uniform illumination in the area irradiated with the laser light. In contrast, when the electro-optical crystal element 5 is provided, interference fringes are still produced, for example, at substantially the same intervals of 150 μm, but the luminance deviation range is as small as ±3% because the deflection direction of the laser light is continuously changed. The non-uniform illumination in the area irradiated with the laser light can therefore be effectively reduced.

The operation of the laser lighting device according to the first embodiment will next be described. First, the laser light 11 is emitted from the light source 1 at a predetermined timing based, for example, on Q-switch laser oscillation. The power of the laser light 11 gradually increases, repeatedly increases and decreases in the vicinity of a maximum of the power, then decreases, and eventually becomes zero. After a predetermined period, the laser light 11 is emitted again based on the laser oscillation. The operation described above is repeated, whereby the laser light emitted from the light source 1 forms pulsed laser light intermittently emitted in the form of pulses. In this process, a trigger pulse is outputted at the timing when the laser light 11 is emitted, and the trigger pulse is used as a trigger in response to which a voltage is applied between the electrodes of the electro-optical crystal element 5.

The pulsed laser light 11 emitted from the light source 1 is incident on the first fly's eye lens 2. The first fly's eye lens 2 has a plurality of convex lenses arranged in a grid pattern. The incident light is divided into light fluxes incident on the respective convex lenses, and each of the light fluxes passes through the corresponding convex lens, is focused at the focal point of the lens, and then diverges. The plurality of divided pulsed laser light beams 12 is then superimposed on each other and incident on the first condenser lens 31. The pulsed laser light beams 12 having passed through the first fly's eye lens 2 and incident on the condenser lens 31 thus have a homogenized intensity distribution in a plane perpendicular to the optical axis.

Pulsed laser light 13 having passed through the condenser lens 31, which is collimated light, passes through the second fly's eye lens 4, which further homogenizes the intensity distribution of the pulsed laser light 13. The resultant pulsed laser light is then incident on the electro-optical crystal material 51 (LN crystal material, for example) of the electro-optical crystal element 5. The electro-optical crystal element 5 is provided with a pair of electrodes that sandwich the optical crystal material 51, and voltage application between the electrodes 52 and 53 is initiated in response to the trigger pulse described above with a predetermined delay t to produce the electric field E. A voltage having, for example, a ramp shape waveform is applied between the electrodes 52 and 53, and the voltage between the electrodes is gradually increased with elapsed time and lowered back to zero after a predetermined period in synchronization, for example, with the cycle of the pulsed laser light.

The refractive index of the electro-optical crystal material 51 continuously changes as the voltage between the electrodes 52 and 53 changes. The pulsed laser light incident on the electro-optical crystal element 5 therefore passes out of the electro-optical crystal element in a continuously changing deflection direction. Pulsed laser light 15 having passed through the electro-optical crystal element 5 passes through the second condenser lens 32 and is emitted in the form of collimated pulsed laser light 18 toward an object to be irradiated with the laser light.

In a laser lighting device of related art, since pulsed laser light is deflected in a fixed direction, interference fringes are produced in an area irradiated with the laser light, undesirably resulting in non-uniform illumination. In the present embodiment, however, since the electro-optical crystal element 5 continuously changes the deflection direction of the laser light, the positions where interference fringes are produced continuously change and the luminance is therefore homogenized over the entire area irradiated with the laser light. The non-uniform illumination in the area irradiated with the laser light can therefore be effectively reduced.

Further, in the present embodiment, two fly's eye lenses are provided in order to homogenize the intensity of the laser light, but one fly's eye lens may be used when a single fly's eye lens can sufficiently homogenize the intensity of the laser light. Moreover, the (first) condenser lens 31 in an upstream position on the optical path of the laser light may be omitted.

Figure 5:
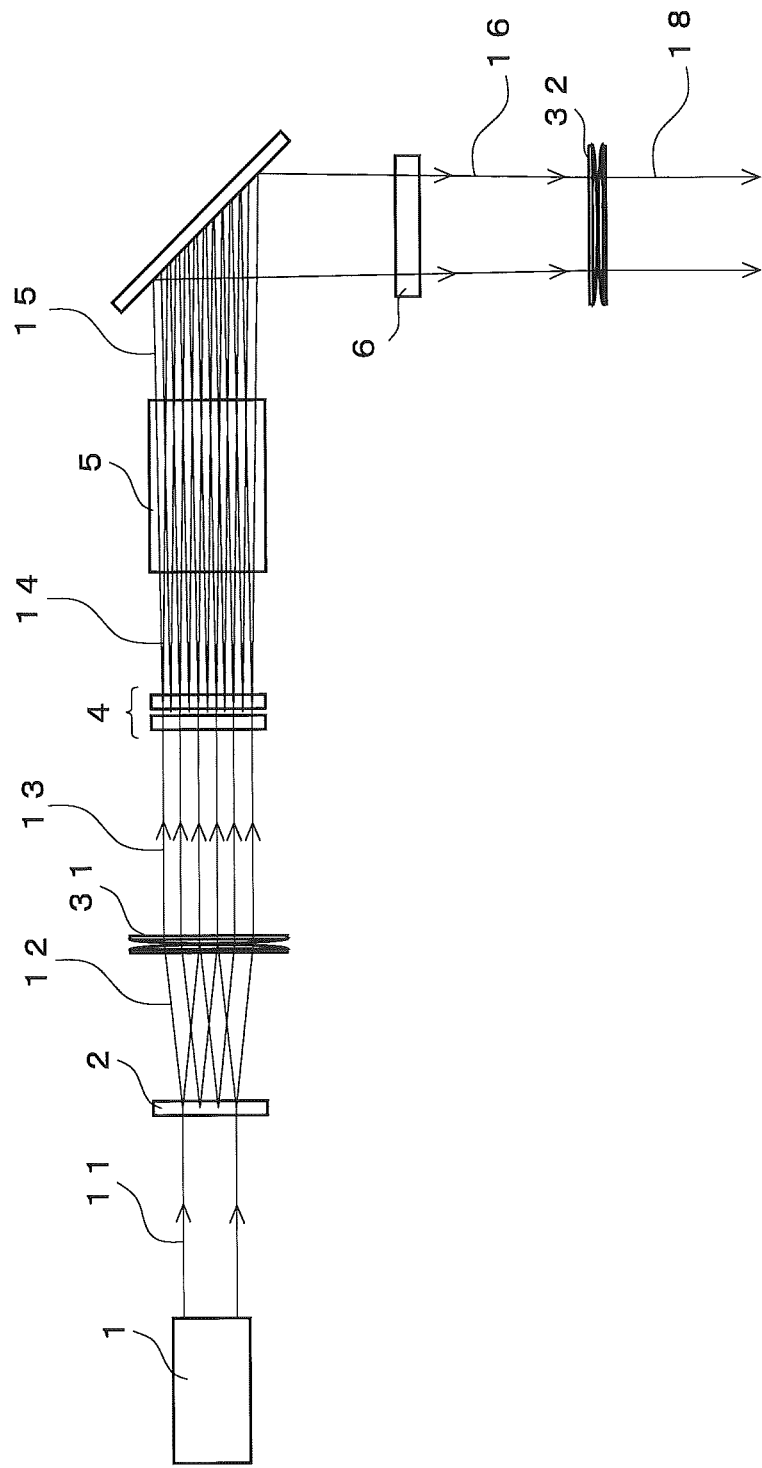
FIG. 5 is a schematic view showing the configuration of a laser lighting device according to a second embodiment of the invention.
Figure 6:
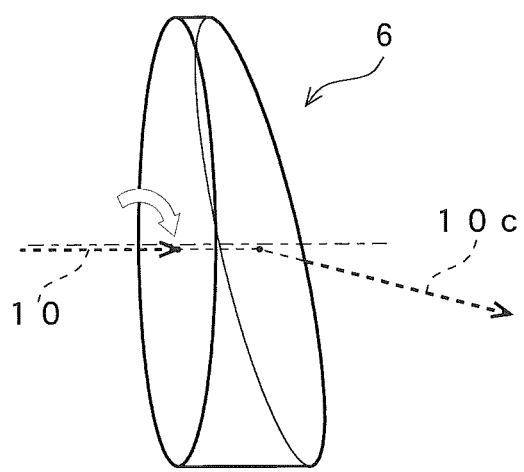
FIG. 6 shows an example of a deflector according to the embodiment of the invention.

A laser lighting device according to a second embodiment of the invention will next be described. FIG. 5 is a schematic view showing the configuration of the laser lighting device according to the second embodiment of the invention. The laser lighting device according to the present embodiment includes a deflector 6 in the optical path of the pulsed laser light 15 in a position between the electro-optical crystal element 5 and the second condenser lens 32, as shown in FIG. 5. The deflector 6 is a plate-shaped member made, for example, of a light transmissive material and so shaped that one surface of the member is inclined, as shown in FIG. 6. In other words, the deflector 6 is known as a wedge prism so configured that when the pulsed laser light 10 is incident, for example, on a surface that is not inclined, the deflection direction of the pulsed laser light 10c changes at the inclined surface. In the present embodiment, the deflector 6 is, for example, so disposed that the surface that is not inclined is perpendicular to the optical axis of the pulsed laser light 10 and that the deflector 6 is rotatable around the optical axis as shown in FIG. 6, whereby the deflection direction of the pulsed laser light 15 (FIG. 5) continuously changes. The deflector 6 is rotated, for example, at a speed F/N×60 [rpm], where N represents the number of pulsed laser light shots per location irradiated with the laser light, and F [Hz] represents the frequency of the pulsed laser light.

As described above, in the present embodiment, since the deflector 6, which deflects light incident thereon with respect to the optical axis of the incident light and allows the deflected light to pass therethrough, is provided, not only can the electro-optical crystal element 5 continuously change the deflection direction of the pulsed laser light but also the deflector 6 can continuously change the deflection direction, whereby occurrence of non-uniform illumination due to interference fringes can be further suppressed as compared with the first embodiment.

The same variety of changes as those made in the first embodiment can also be made in the present embodiment.

Figure 7:
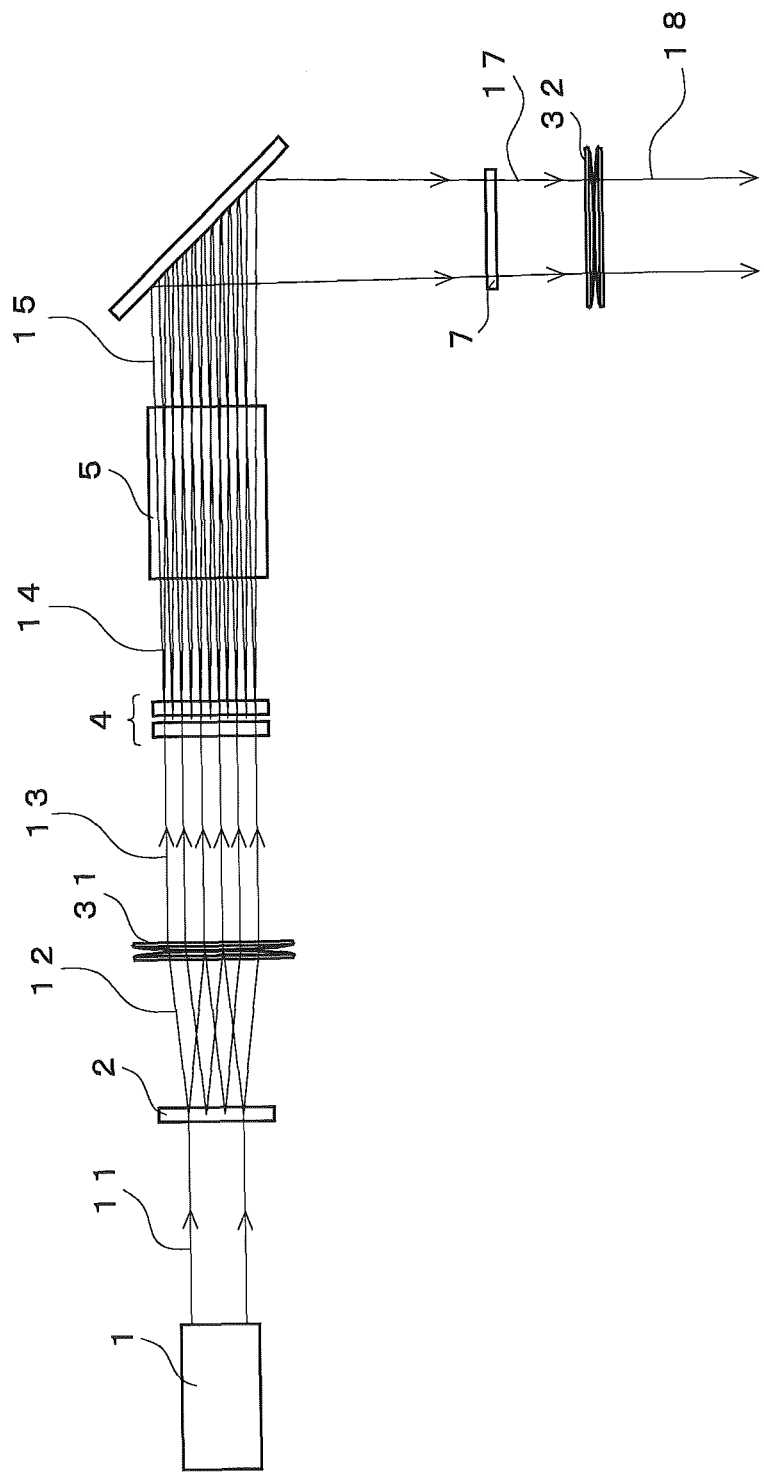
FIG. 7 is a schematic view showing the configuration of a laser lighting device according to a third embodiment of the invention.
Figure 8:
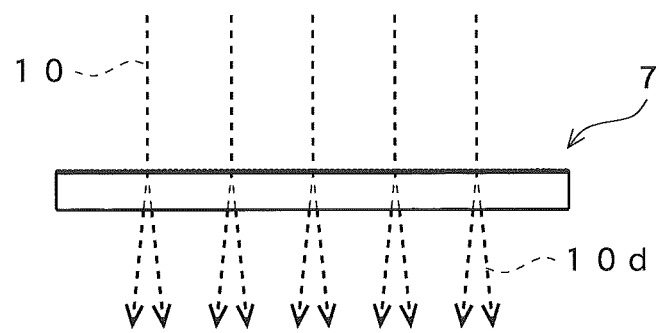
FIG. 8 shows an example of a light diffuser according to the embodiment of the invention.

A laser lighting device according to a third embodiment of the invention will next be described. FIG. 7 is a schematic view showing the configuration of the laser lighting device according to the third embodiment of the invention. The laser lighting device according to the present embodiment includes a light diffuser 7 in the optical path of the pulsed laser light 15 in a position between the electro-optical crystal element 5 and the second condenser lens 32, as shown in FIG. 7. The light diffuser 7 is, for example, a light transmissive plate-shaped member having a roughened surface formed on one side of the member, like a ground glass surface, as shown in FIG. 8. In other words, the light diffuser 7 is known as a diffuser plate that diffuses the pulsed laser light 10 incident thereon in such a way that the diffused light spreads away from the optical axis of the incident light upon passing therethrough (passed light 10d in FIG. 8). As a result, the light 15 incident on the light diffuser 7 passes therethrough in diffused deflection directions.

In the present embodiment, by providing the light diffuser 7 that diffuses light incident thereon in such a way that the diffused light spreads away from the optical axis of the incident light before being allowed to pass therethrough, the pulsed laser light 15 having passed through the electro-optical crystal element 5 in a continuously changing deflection direction passes through the light diffuser, whereby the deflection direction of the pulsed laser light 15 is further diffused. The occurrence of interference fringes is thereby suppressed and non-uniform illumination is effectively eliminated as compared with the first embodiment.

The same variety of changes as those made in the first embodiment can also be made in the present embodiment.

Figure 9:
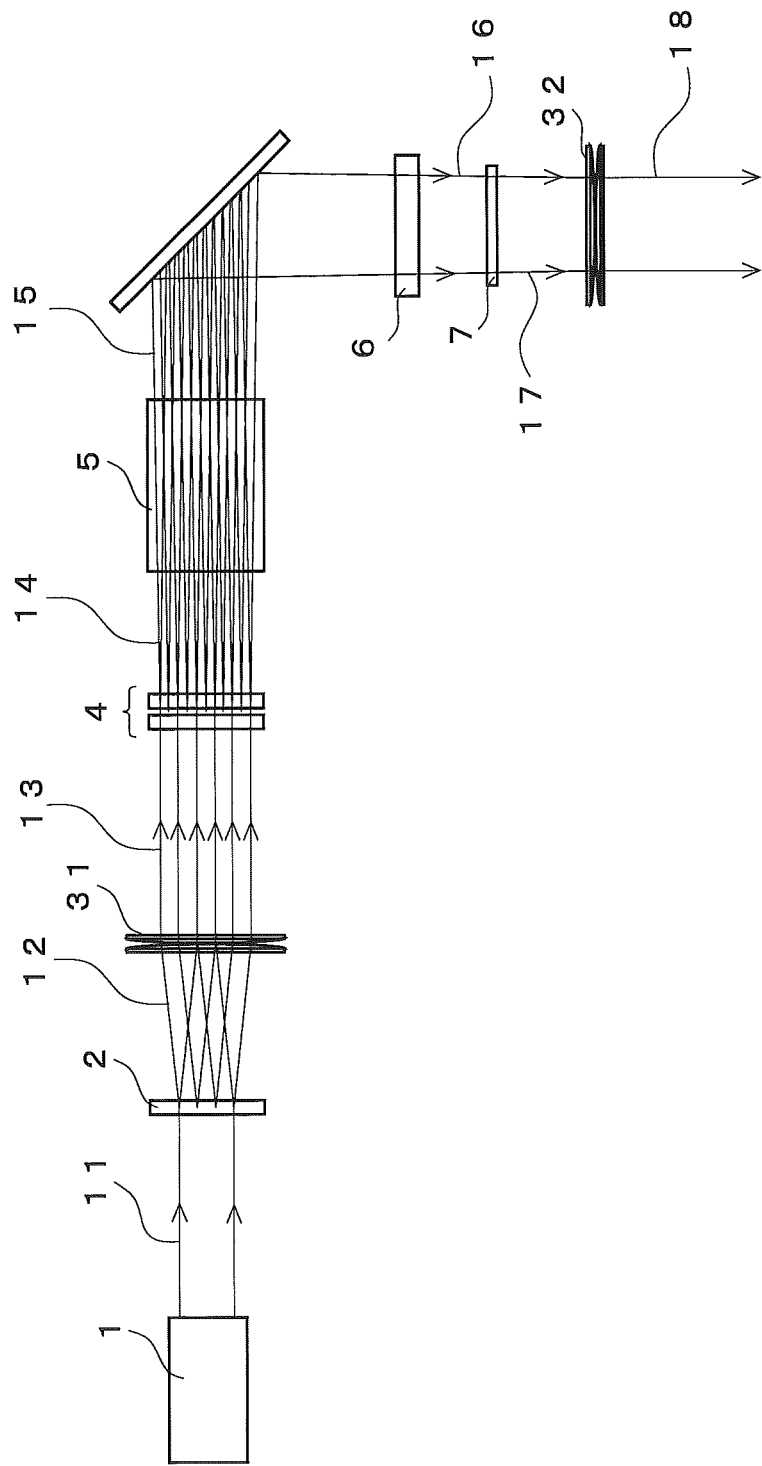
FIG. 9 is a schematic view showing the configuration of a laser lighting device according to a fourth embodiment of the invention.

A laser lighting device according to a fourth embodiment of the invention will next be described. In the present embodiment, the laser lighting device according to the first embodiment is provided with the deflector 6 in the second embodiment and the light diffuser 7 in the third embodiment in the optical path of the pulsed laser light 15 in positions between the electro-optical crystal element 5 and the second condenser lens 32, as shown in FIG. 9. No detailed description of the components in the present embodiment will be made.

In the present embodiment, by providing the deflector 6, which deflects light incident thereon with respect to the optical axis thereof and allows the deflected light to pass therethrough, and the light diffuser 7, which diffuses light incident thereon in such a way that the diffused light spreads away from the optical axis of the incident light and allows the diffused light to pass therethrough, not only can the electro-optical crystal element 5 and the deflector 6 continuously change the deflection direction of the pulsed laser light but by passing through the diffuser the deflection direction of the pulsed laser light 15 is diffused. Therefore, non-uniform illumination due to interference fringes can be most effectively eliminated as compared with the first to third embodiments.

As described above, in the present invention, the electro-optical crystal element is provided in the optical path of the pulsed laser light, the deflection direction of incident light is continuously changed, and the deflected light is allowed to pass therethrough, whereby the positions where interference fringes are produced by light having passed through the fly's eye lenses continuously change. The luminance of the pulsed laser light 18 emitted from the laser lighting device can thereby be homogenized over an entire area irradiated with the laser light and hence non-uniform illumination can be reduced.

Figure 10:
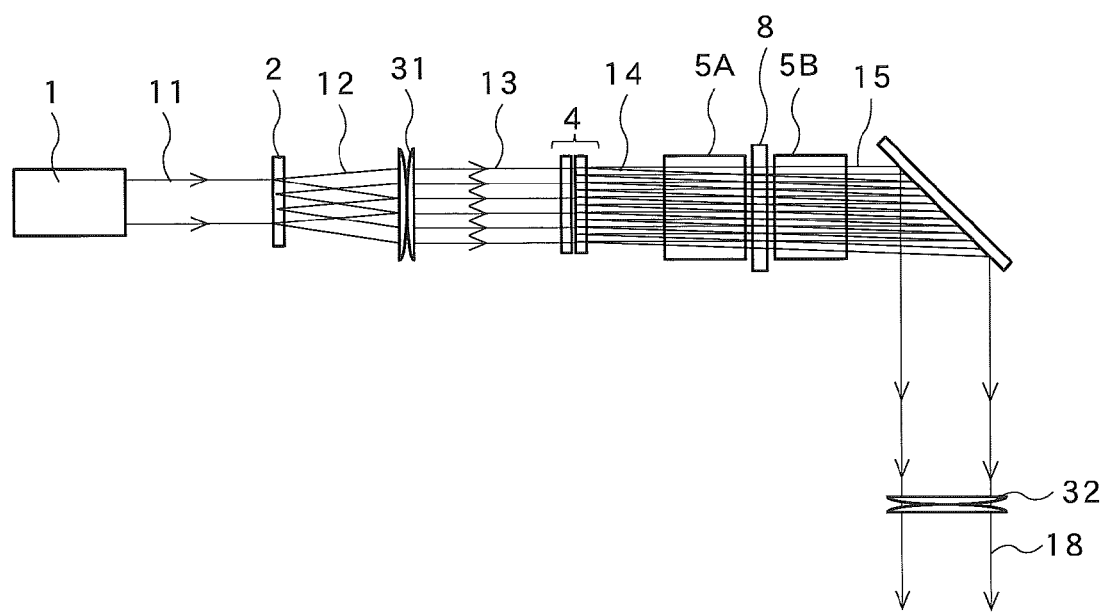
FIG. 10 is a schematic view showing the configuration of a laser lighting device according to a fifth embodiment of the invention.

A laser lighting device according to a fifth embodiment of the invention will next be described. FIG. 10 is a schematic view showing the configuration of the laser lighting device according to the fifth embodiment of the invention. In FIG. 10, the same components as those in FIG. 1 have the same reference characters, and no detailed description thereof will be made. In the present embodiment, a first electro-optical crystal element 5A and a second electro-optical crystal element 5B are provided in series in the optical path of the pulsed laser light having passed through the second fly's eye lens 4 as shown in FIG. 10, and the laser light incident on the electro-optical crystal elements 5A and 5B passes therethrough in continuously two-dimensionally changing deflection directions. A half-wave plate 8 (λ/2 plate) is disposed between the first electro-optical crystal element 5A and the second electro-optical crystal electro-optical crystal element 5B. The half-wave plate 8 provides pulsed laser light 14 having passed through the first electro-optical crystal element 5A with a phase difference of 180° or changes the polarization direction of the linearly polarized light and then causes the resultant light to be incident on the second electro-optical crystal element 5B. The light having passed through the electro-optical crystal elements 5A and 5B then passes through the second condenser lens 32 and is emitted in the form of collimated pulsed laser light 18. In the present invention, a total reflection mirror and other optical members may be provided in positions between the optical elements, for example, as shown in FIG. 10.

The electro-optical crystal element 5 (5A, 5B) is formed of the pair of triangular electrodes 52 and 53 disposed in parallel to the optical axis of the pulsed laser light 10, and the box-shaped optical crystal material 51 disposed between the electrodes 52 and 53, and a voltage can be applied between the electrodes 52 and 53, as shown, for example, in FIG. 2(a) described above. The electrodes 52 and 53 have a triangular shape and sandwich the optical crystal material 51, but the upper and lower surfaces of the portion of the optical crystal material 51 where no electrode 52 or 53 is present are exposed. The optical crystal material 51 is a light transmissive crystal material made, for example, of Li and Nb (LN crystal material). When a voltage is applied between the electrodes 52 and 53 to produce the electric field E, the refractive index of the optical crystal material 51 changes at the boundary between the portion of the optical crystal material 51 that is sandwiched by the electrodes 52 and 53 and the portion of the optical crystal material 51 where no electrode 52 or 53 is present. That is, when a voltage of zero is applied between the electrodes 52 and 53, no electric field E is produced (E=0) and the pulsed laser light 10 incident on the optical crystal material 51 is not deflected but directly passes therethrough as shown in FIG. 2(b) (passed light 10a in FIG. 2(b)), whereas when a nonzero voltage is applied between the electrodes 52 and 53, the electric field E is produced and the pulsed laser light 10 incident on the optical crystal material 51 is deflected with respect to the direction in which the pulsed laser light 10 is incident allowed to pass therethrough, as shown in FIG. 2(c) (passed light 10b in FIG. 2(c)). For example, when the optical crystal material 51 is made of an LN crystal material, the wavelength of light that can pass through the optical crystal material 51 ranges from 370 to 5000 nm, within which the wavelength of the pulsed laser light to be used in the invention falls. The refractive index n of an LN crystal material is given by Expressions 1 and 2 described above and is a function of the electric field E [V/m] produced by the voltage application or proportional to the strength of the electric field E. As described above, $n_e$ and $r_{33}$ in Expressions 1 and 2 are coefficients. For example, $n_e$=2.156 and $r_{33}$=3.2×10$^{-11}$ [m/V] when the wavelength of the pulsed laser light is 1064 nm.

Figure 12:
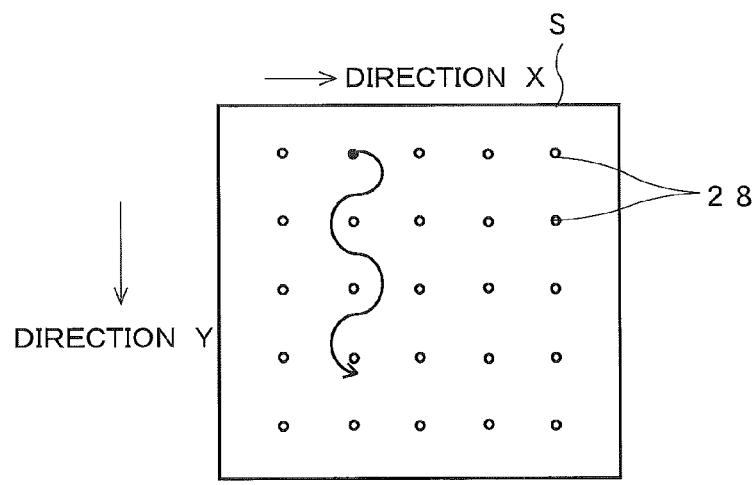
FIG. 12 shows movement of interference fringes in the present embodiment.

In the present embodiment, the voltage applied between the electrodes 52 and 53 of the electro-optical crystal element 5 is also continuously changed as shown, for example, in FIG. 3. On the other hand, in the present embodiment, unlike the first embodiment, a voltage is applied between the electrodes of the first electro-optical crystal element 5A to deflect laser light passing through the first electro-optical crystal element 5A in a specific direction X, for example, in the horizontal direction in a plane S perpendicular to the optical axis of the laser light shown in FIG. 12. On the other hand, a voltage is applied to the second electro-optical crystal element 5B to deflect the laser light in a direction Y perpendicular to the direction X, for example, in the vertical direction in the plane S shown in FIG. 12. Interference fringe spots 28 thus two-dimensionally move in the X-Y plane, as shown in FIG. 12. Since the first electro-optical crystal element 5A for the direction X and the second electro-optical crystal element 5B for the direction Y have crystal axes different from each other by 90°, the laser light incident on the two electro-optical crystal elements need to have polarization planes different from each other by 90°. To this end, the half-wave plate 8 is disposed between the first electro-optical crystal element 5A and the second electro-optical crystal element 5B. The half-wave plate 8 rotates the polarization plane of the laser light having passed through the first electro-optical crystal element 5A by 90°, and the laser light is then incident on the second electro-optical crystal element 5B.

Figure 11:
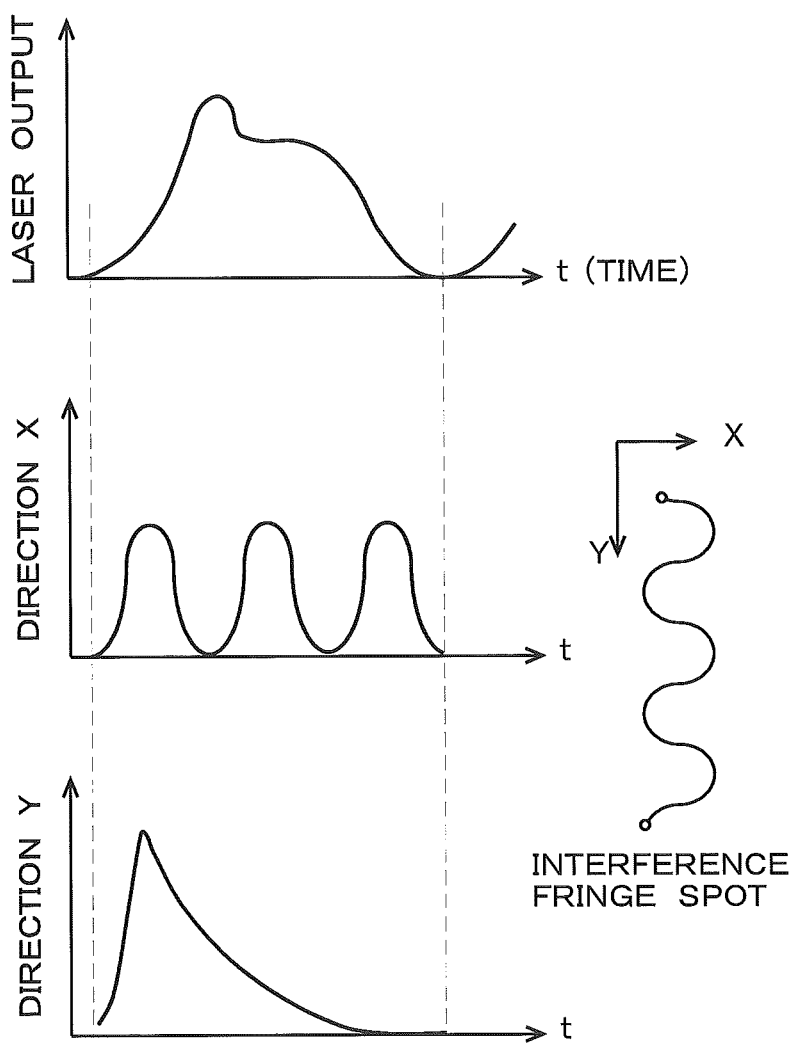
FIG. 11 shows laser power versus electro-optical crystal element drive voltage swept in directions X and Y in the present embodiment.

FIG. 11 shows the deflection directions provided by the first and second electro-optical crystal elements 5A, 5B within a pulse of laser light. In a single pulse of the laser light, a voltage that cycles three times is applied to the first electro-optical crystal element 5A, which then deflects the laser light passing therethrough in such a way that the laser light moves back and forth three times in the direction X. Further, in the single pulse of the laser light, a voltage that changes in a pattern in which the voltage first increases and then gradually decreases is applied to the second electro-optical crystal element 5B, which then deflects the laser light passing therethrough in such a way that the laser light moves back and forth once in the direction Y at low speed. FIG. 12 shows that the interference fringe spots 28 produced by the laser light having passed through the fly's eye lenses are arranged in a grid pattern in a case in which the laser light is not deflected. When the laser light described above is deflected and the X and Y deflection directions are controlled in association with each other, each of the interference fringe spots 28 moves in the direction Y in a serpentine manner. When each of the interference fringe spots 28 moves two-dimensionally as described above, illumination light will show no intensity unevenness in a plane irradiated with the illumination light. The luminance of the pulsed laser light emitted from the laser lighting device is thus homogenized over the entire area irradiated with the laser light. Assuming that the interference fringe spots 28 are formed at intervals d (150 μm, for example) in the directions X and Y, the distance (amplitude) over which each of the interference fringe spots 28 moves in the direction X in a single pulse is preferably set at the interval d, and the distance over which the interference fringe spot 28 moves in the direction Y is also preferably set at d. In this case, since the interference fringe spots 28 move two-dimensionally in an area surrounded by four interference fringe spots 28 present in grid positions, all the interference fringe spots 28 present in the grid positions efficiently move without being affected by the interference fringe spots 28 adjacent in the directions X and Y, whereby the luminance can be homogenized and non-uniform illumination in the area irradiated with the laser light can be effectively reduced.

The operation of the laser lighting device according to the fifth embodiment of the invention will next be described. First, the laser light 11 is emitted from the light source 1 based, for example, on Q-switch laser oscillation at a predetermined timing. The power of the laser light 11 gradually increases, repeatedly increases and decreases in the vicinity of a maximum of the power, then decreases, and eventually becomes zero. After a predetermined period, the laser light 11 is emitted again based on the laser oscillation. The operation described above is repeated, whereby the laser light emitted from the light source 1 forms pulsed laser light intermittently emitted in the form of pulses. In this process, a trigger pulse is outputted at the timing when the laser light 11 is emitted, and the trigger pulse is used as a trigger in response to which a voltage is applied between the electrodes of the electro-optical crystal elements 5A, 5B.

The pulsed laser light 11 emitted from the light source 1 is incident on the first fly's eye lens 2. The first fly's eye lens 2 has a plurality of convex lenses arranged in a grid pattern. The light incident on the first fly's eye lens is divided into light fluxes incident on the respective convex lenses, and each of the light fluxes passes through the corresponding convex lens, is focused at the focal point of the lens, and then diverges. The plurality of divided pulsed laser light beams 12 is then superimposed on each other and incident on the first condenser lens 31. The pulsed laser light beams 12 having passed through the first fly's eye lens 2 and incident on the condenser lens 31 thus have a homogenized intensity distribution in a plane perpendicular to the optical axis.

The pulsed laser light 13 having passed through the condenser lens 31, which is collimated light, passes through the second fly's eye lens 4, which further homogenizes the intensity distribution of the pulsed laser light 13. The laser light 14 having passed through the second fly's eye lens 4 is then incident on the optical crystal material 51 (LN crystal material, for example) of each of the electro-optical crystal elements 5A and 5B. Each of the electro-optical crystal elements 5A and 5B is provided with a pair of electrodes that sandwich the optical crystal material 51, and voltage application between the electrodes 52 and 53 is initiated in response to the trigger pulse described above with a predetermined delay t to produce the electric field E. A voltage having, for example, a ramp shape waveform is applied between the electrodes 52 and 53, and the voltage between the electrodes is gradually increased with elapsed time and lowered back to zero after a predetermined period in synchronization, for example, with the cycle of the pulsed laser light.

The refractive index of the optical crystal material 51 continuously changes as the voltage between the electrodes 52 and 53 changes. The pulsed laser light incident on each of the electro-optical crystal elements 5A and 5B therefore passes therethrough in a continuously changing deflection direction. The pulsed laser light 15 having passed through the electro-optical crystal elements 5A, 5B passes through the second condenser lens 32 and is emitted in the form of collimated light toward an object to be irradiated with the laser light.

In a laser lighting device of related art, since pulsed laser light is deflected in a fixed direction, interference fringes are produced in an area irradiated with the laser light, undesirably resulting in non-uniform illumination. In the present embodiment, however, since the electro-optical crystal elements 5A and 5B continuously change the deflection direction of the laser light in the directions X and Y, the positions where the interference fringes are produced continuously change and move two-dimensionally. The non-uniform illumination in the area irradiated with the laser light can therefore be effectively reduced.

Figure 18:
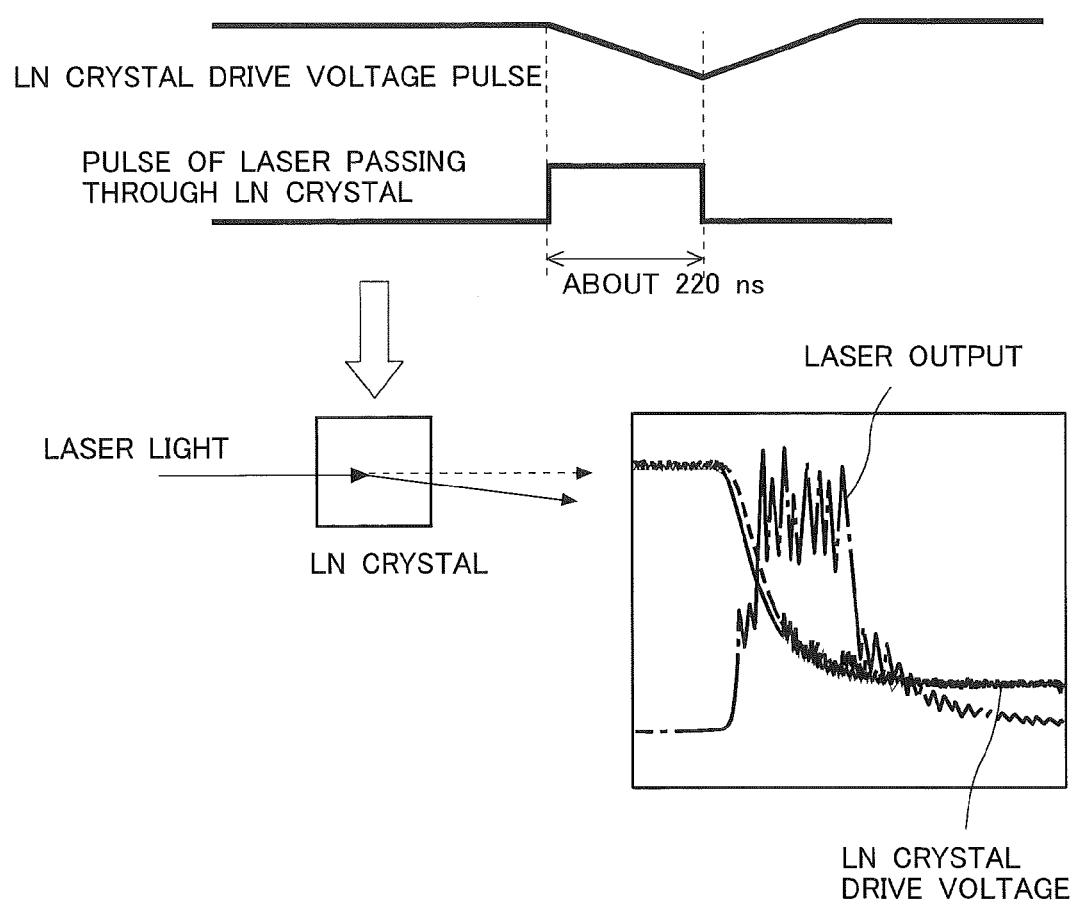
FIG. 18 shows a drive voltage waveform and other behaviors in a case in which the deflection direction of laser light is changed in a single direction.

When a pulsed voltage is applied to an electro-optical crystal element (LN crystal) at the timing when a laser pulse, for example, having a pulse width of 220 ns, passes through the LN crystal, the deflection direction of the laser light can be continuously changed only in one direction, as shown in FIG. 18. In this case, non-uniform illumination due to interference fringes also decreases as compared with a case in which no pulsed voltage is applied to the LN crystal or no control is performed on the deflection direction of the laser light, as shown in FIG. 19.

On the other hand, in the present invention, since a drive voltage applied to the first electro-optical crystal element 5A is swept (in the X-direction) to change the deflection direction of the laser light in the direction X, and a drive voltage applied to the second electro-optical crystal element 5B is swept (in the Y-direction) to change the deflection direction of the laser light in the direction Y, the interference fringe spots move two-dimensionally, as shown in FIGS. 20(a) and 20(b). As a result of sweeping the drive voltages, non-uniform illumination due to the interference fringes is further noticeably reduced, as indicated by the interference fringe spots in FIG. 21. The interference fringe distribution under a condition 2 shown in FIG. 19 is an average distribution obtained by superimposing four shots on each other, whereas the interference fringe distribution under a (drive voltage swept) condition in FIG. 21 is a distribution obtained from only a single shot. The interference fringe distribution under the (drive voltage swept) condition in FIG. 21 therefore shows a greater number of interference fringes than in FIG. 19 (condition 2).

There shall now be considered a case in which the deflection direction of the laser light is changed in the direction X at high speed as in the present embodiment, and the first electro-optical crystal element 5A for the direction X is made of the same optical crystal material of the second electro-optical crystal element 5B for the direction Y, which only needs to be driven at low speed. Assuming that the second electro-optical crystal element 5B is, for example, a single capacitor having the optical crystal material 51 sandwiched between the electrodes 52 and 53, the first electro-optical crystal element 5A corresponds to three such capacitors connected to each other in series. Further assuming that a single first electro-optical crystal element 5A has an electrostatic capacitance $C_0$, three first electro-optical crystal elements 5A connected to each other in series have a reduced electrostatic capacitance (⅓) $C_0$. The three first electro-optical crystal elements 5A connected to each other in series therefore have a total load capacitance reduced to one-third the load capacitance of the single first electro-optical crystal element 5A, whereby the refractive index can be changed at high speed in correspondence with the fast change in the drive voltage.

In the present embodiment, two fly's eye lenses are provided in order to homogenize the intensity of the laser light, but the number of fly's eye lenses may be only one when the single fly's eye lens can sufficiently homogenize the intensity of the laser light. Moreover, the (first) condenser lens 31 in an upstream position on the optical path of the laser light is not necessarily provided.

Figure 13:
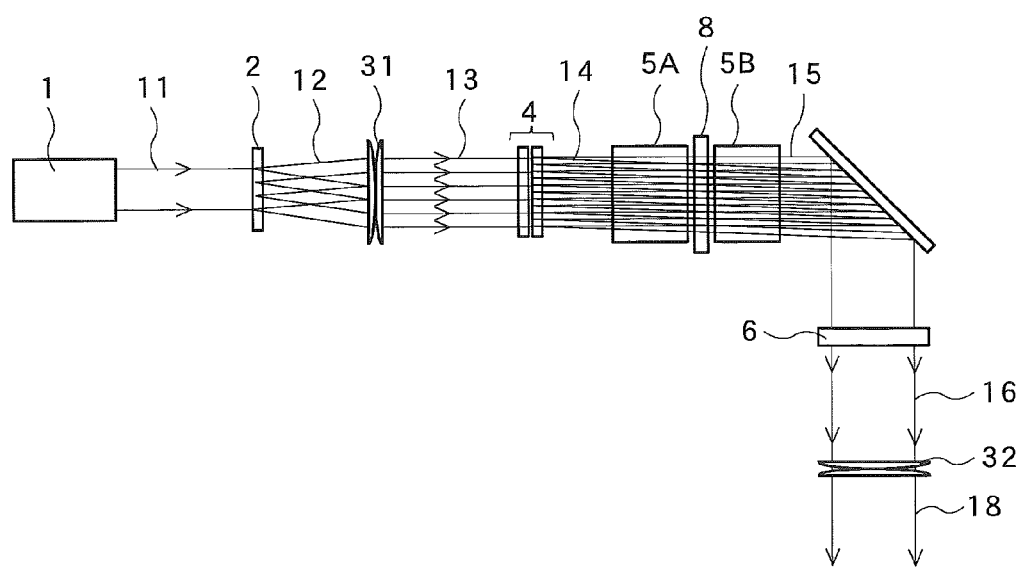
FIG. 13 is a schematic view showing the configuration of a laser lighting device according to a sixth embodiment of the invention.
Figure 14:
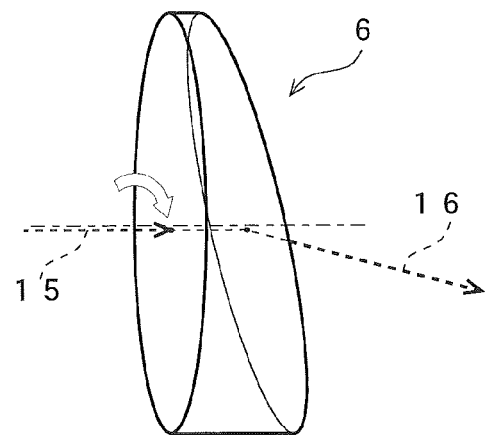
FIG. 14 shows an example of a deflector according to the present embodiment.

A laser lighting device according to a sixth embodiment of the invention will next be described. FIG. 13 is a schematic view showing the configuration of the laser lighting device according to the sixth embodiment of the invention. The laser lighting device according to the present embodiment includes the deflector 6 in the optical path of the pulsed laser light 15 in a position between the electro-optical crystal elements 5A, 5B and the second condenser lens 32, as shown in FIG. 13. The deflector 6 is a plate-shaped member made, for example, of a light transmissive material and so shaped that one surface of the member is inclined, as shown in FIG. 14. In other words, the deflector 6 is known as a wedge prism so configured that when the pulsed laser light 15 is, for example, incident on a surface that is not inclined, the deflection direction of the pulsed laser light 15 changes at the inclined surface. In the present embodiment, the deflector 6 is, for example, so disposed that the surface that is not inclined is perpendicular to the optical axis of the pulsed laser light 15 and that the deflector 6 can rotate around the optical axis as shown in FIG. 14, whereby the deflection direction of pulsed laser light 16 having passed through the deflector 6 continuously changes. The deflector 6 is caused to rotate, for example, at a speed F/N×60 [rpm], where N represents the number of pulsed laser light shots per location irradiated with the laser light, and F [Hz] represents the frequency of the pulsed laser light.

As described above, in the present embodiment, by providing the deflector 6, which deflects light incident thereon with respect to the optical axis of the incident light and allows the deflected light to pass therethrough, not only can the electro-optical crystal elements 5A and 5B continuously change the deflection direction of the pulsed laser light two-dimensionally but also the deflector 6 can continuously change the deflection direction, whereby non-uniform illumination due to interference fringes can be further suppressed as compared with the fifth embodiment. The same variety of changes as those made in the fifth embodiment can be made also in the present embodiment.

Figure 15:
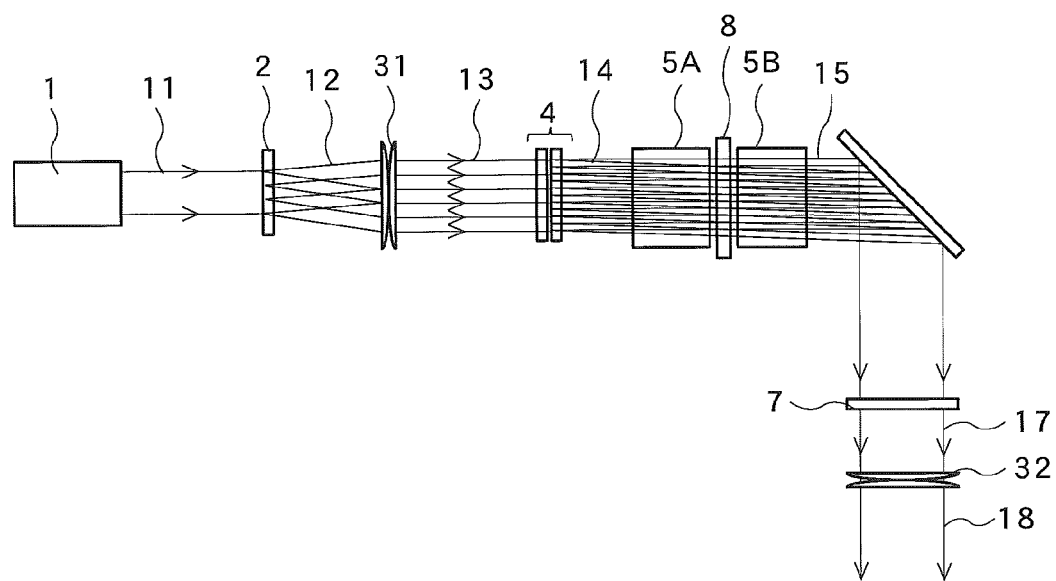
FIG. 15 is a schematic view showing the configuration of a laser lighting device according to a seventh embodiment of the invention.
Figure 16:
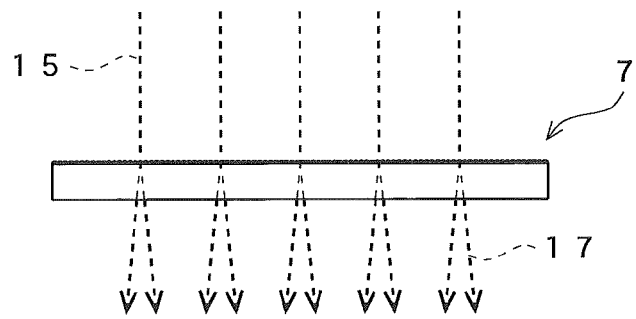
FIG. 16 shows an example of a light diffuser according to the present embodiment.

A laser lighting device according to a seventh embodiment of the invention will next be described. FIG. 15 is a schematic view showing the configuration of the laser lighting device according to the seventh embodiment of the invention. The laser lighting device according to the present embodiment includes the light diffuser 7 in the optical path of the pulsed laser light 15 in a position between the electro-optical crystal elements 5A, 5B and the second condenser lens 32, as shown in FIG. 15. The light diffuser 7 is, for example, a light transmissive plate-shaped member having a roughened surface formed on one side of the member, like a ground glass surface, as shown in FIG. 16. In other words, the light diffuser 7 is known as a diffuser plate that diffuses the pulsed laser light 15 incident thereon in such a way that the diffused light spreads away from the optical axis of the incident light and is allowed to pass therethrough (pulsed laser light 17 in FIG. 16). As a result, the deflection directions of the light incident on the light diffuser 7 (pulsed laser light 15) is diffused and the diffused light impinges on the condenser lens 32 in the form of pulsed laser light 17.

In the present embodiment, by providing the light diffuser 7, which diffuses light incident thereon in such a way that the diffused light spreads away from the optical axis of the incident light and allows the light to pass therethrough, the pulsed laser light 15 having passed through the electro-optical crystal elements 5A and 5B and continuously changed deflection direction in two dimensions passes through the light diffuser 7, whereby the deflection direction of the pulsed laser light 15 is diffused. Therefore, the occurrence of interference fringes is suppressed and non-uniform illumination is effectively eliminated as compared with the fifth embodiment. The same variety of changes as those made in the fifth embodiment can be made also in the present embodiment.

Figure 17:
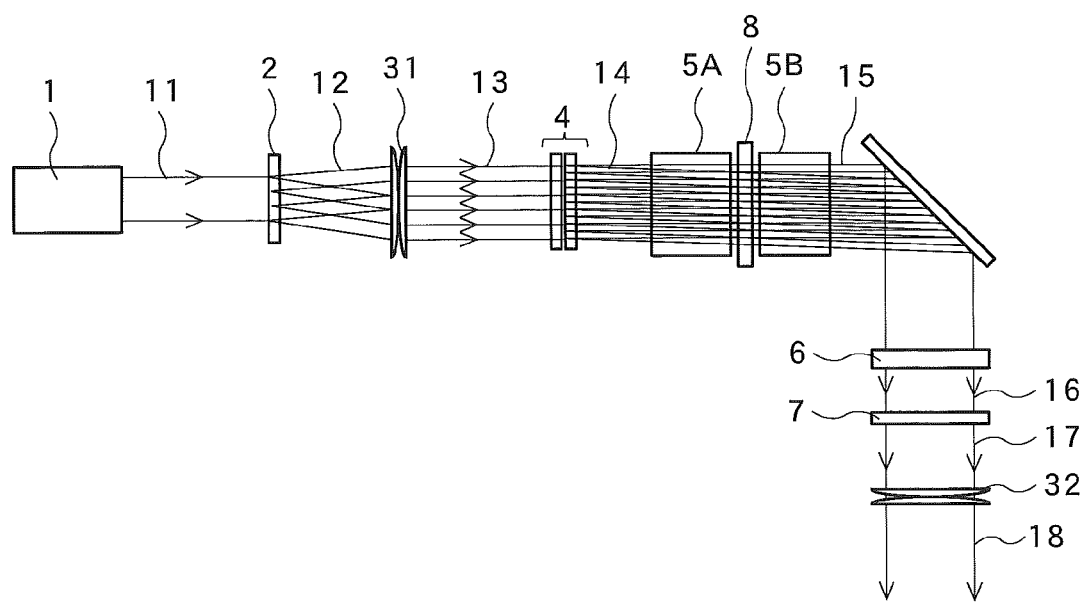
FIG. 17 is a schematic view showing the configuration of a laser lighting device according to an eighth embodiment of the invention.

A laser lighting device according to an eighth embodiment of the invention will next be described. In the present embodiment, the laser lighting device according to the fifth embodiment is provided with the deflector 6 in the second embodiment and the light diffuser 7 in the third embodiment in the optical path of the pulsed laser light 15 in positions between the electro-optical crystal elements 5A, 5B and the second condenser lens 32, as shown in FIG. 17. No detailed description of the components in the present embodiment will be made.

In the present embodiment, by providing the deflector 6, which deflects light incident thereon with respect to the optical path thereof and allows the deflected light to pass therethrough, and the light diffuser 7, which diffuses light incident thereon in such a way that the diffused light spreads away from the optical axis of the incident light and allows the light to pass therethrough, not only can the electro-optical crystal elements 5A, 5B continuously change the deflection direction of the pulsed laser light two-dimensionally and the deflector 6 continuously change the deflection direction of the pulsed laser light but having the light diffuser pass the pulsed laser light causes the deflection direction to diffuse. Therefore, non-uniform illumination due to interference fringes can be more effectively eliminated than in the fifth to seventh embodiments.

As described above, in the present invention, by providing the first and second electro-optical crystal elements in the optical path of the pulsed laser light, continuously changing the deflection direction of incident light two-dimensionally, and allowing the deflected light to pass therethrough, the positions where interference fringes are produced by light having passed through the fly's eye lenses continuously change, whereby the luminance of the pulsed laser light emitted from the laser lighting device can be homogenized over an entire area irradiated with the laser light and hence non-uniform illumination can be reduced. In each of the embodiments described above, the deflection direction changed by the first electro-optical crystal element, which provides a fine change (scan), is changed in the horizontal direction, whereas the deflection direction changed by the second electro-optical crystal element, which provides a mild change (scan), is changed in the vertical direction, but the relationship described above may be reversed. Further, the deflection direction is not necessarily changed in the horizontal and vertical directions and may be changed in any direction as long as interference fringes can be moved two-dimensionally.

INDUSTRIAL APPLICABILITY

The invention, which is used with a laser lighting device used for laser annealing and other purposes, can reduce non-uniform illumination due to interference fringes produced by light having passed through a fly's eye lens and hence provide laser light with a uniform intensity distribution without generation of interference fringes, greatly contributing to improvement in quality of the laser light used for annealing and other purposes.

[Key]
1: Light source
2, 4: Fly's eye lens
8: Half-wave plate
10 to 18: pulsed laser light
31, 32: Condenser lens
5: Electro-optical crystal element (LN crystal element)
6: Deflector (wedge prism)
7: Light diffuser (diffuser plate)
51: Optical crystal material (LN crystal material)
52, 53: Electrode
54: Power source

What is claimed is:

1. A laser lighting device comprising: a light source for emitting pulsed laser light; one or more fly's eye lenses disposed in an optical path of the pulsed laser light from the light source, the fly's eye lenses configured for homogenizing the intensity of said pulsed laser light in a plane perpendicular to an optical axis of said pulsed laser light; a plurality of condenser lenses disposed in the optical path of the pulsed laser light having passed through said fly's eye lenses, the condenser lenses configured for collimating incident light, and allowing the collimated light to pass therethrough; a first electro-optical crystal element disposed in the optical path of said pulsed laser light in a position between said light source and a condenser lens disposed in a last stage, the first electro-optical crystal element configured for continuously changing a deflection direction of incident light in a direction X in a plane perpendicular to an optical axis of said laser light, and allowing the deflected light to pass therethrough; a second electro-optical crystal element disposed in the optical path of said pulsed laser light in a position between said light source and the condenser lens disposed in the last stage, the second electro-optical crystal element configured for continuously changing a deflection direction of incident light in a direction Y perpendicular to the direction X in the plane perpendicular to the optical axis of said laser light, and allowing the deflected light to pass therethrough; a half-wave plate disposed between said first electro-optical crystal element and said second electro-optical crystal element for rotating the polarization plane of the laser light having passed through said first electro-optical crystal element by 90°, and then making the laser light being incident on the second electro-optical crystal element; and a controller for controlling voltages applied to said electro-optical crystal elements in association with each other to continuously move interference fringes two-dimensionally in a plane irradiated with light having passed through said fly's eye lenses.

2. The laser lighting device according to claim 1, wherein each of said electro-optical crystal elements has a pair of electrodes disposed in parallel to the optical axis of said pulsed laser light and an optical crystal material disposed between the electrodes, and a voltage is applied between said electrodes to produce an electric field that changes a refractive index of said electro-optical crystal element and hence changes the direction in which said incident light is deflected.

3. The laser lighting device according to claim 1, wherein said controller controls said applied voltages in such a way that the deflection direction of the laser light is changed by said first electro-optical crystal element at a higher speed than the deflection direction of the laser light is changed by said second electro-optical crystal element.

4. The laser lighting device according to claim 2, wherein the voltage is applied between said electrodes of each of said electro-optical crystal elements in synchronization with a cycle of said pulsed laser light.

5. The laser lighting device according to claim 1, further comprising a light diffuser disposed in the optical path of said pulsed laser light in a position between said electro-optical crystal elements and said condenser lens, the light diffuser configured for diffusing incident light in such a way that the diffused light spreads away from an optical axis of the incident light, and allowing the diffused light to pass therethrough.

6. The laser lighting device according to claim 1, further comprising a deflector disposed in the optical path of said pulsed laser light in a position between said electro-optical crystal elements and said condenser lens, the deflector configured for deflecting incident light with respect to an optical axis thereof, and allowing the deflected light to pass therethrough.

7. The laser lighting device according to claim 1, wherein said first electro-optical crystal element and said second electro-optical crystal element each include triangular electrodes disposed in parallel to the optical axis of the pulsed laser light.

8. The laser lighting device according to claim 1, the half-wave plate provides pulsed laser light having passed through the first electro-optical crystal element with a phase difference of 180° or changes the polarization direction of the linearly polarized light, and then, the half-wave plate causes the resultant light to be incident on the second electro-optical crystal element.

9. The laser lighting device according to claim 1, wherein the half-wave plate is disposed in series with said first electro-optical crystal element and said second electro-optical crystal element.

10. The laser lighting device according to claim 1, wherein the half-wave plate is disposed adjacent to said first electro-optical crystal element and said second electro-optical crystal element.

* * * * *